March 13, 1928.  
M. Y. FIELDHOUSE  
1,662,382  
WATER METER  
Filed Feb. 7, 1925
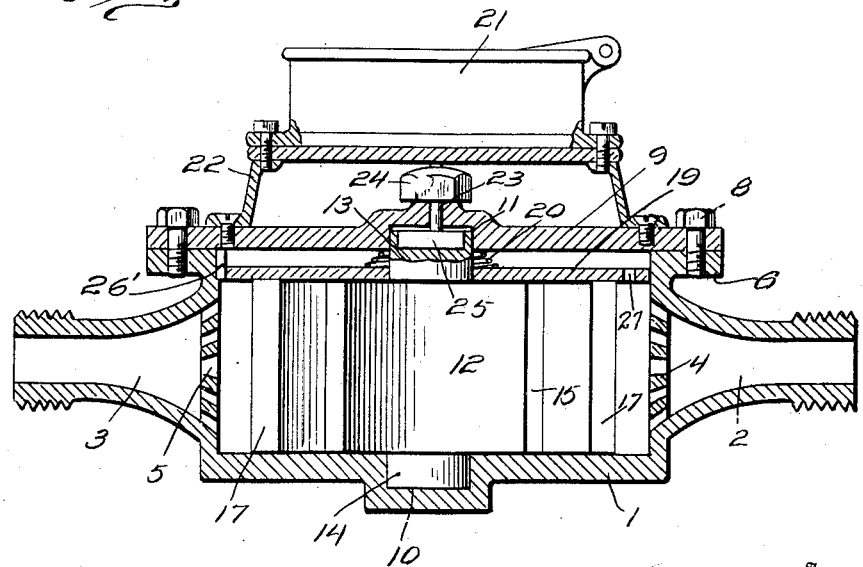
Inventor  
M. Y. Fieldhouse.  
By Clarence O'Brien  
Attorney Patented Mar. 13, 1928.

1,662,382

UNITED STATES PATENT OFFICE.

MATTHEW Y. FIELDHOUSE, OF MAYSVILLE, KENTUCKY.

WATER METER.

Application filed February 7, 1925. Serial No. 7,668.

This invention relates to improvements in meters and is more particularly adapted to a device for use in connection with a water supply pipe, whereby the amount of water consumed may be accurately ascertained.

One of the important objects of the present invention is to provide a water meter which includes a rotor having radially extending slidable blades adapted for engagement with the inner wall of a suitable casing, the water entering the casing causing the rotor to be revolved due to the action of the water against the blades, the operating stem of the meter or register being operatively associated with said rotor.

A further object is to provide a water meter of the above mentioned character, wherein the same is of such construction as to enable the several parts to be readily assembled and disassembled, the device being further simple in construction, inexpensive, strong and durable and further well adapted for the purposes for which it is designated.

Other objects and advantages of this invention will become apparent during the course of the following description.

In the accompanying drawing forming a part of this specification, and in which like numerals designate like parts throughout the same:

Figure 1 is a top plan view of the casing with the cover plate removed and illustrating the rotor in plan, and Figure 2 is a longitudinal sectional view through the casing and through the cover plate therefor, and the support arranged thereon.

In the drawing wherein for the purpose of illustration is shown the preferred embodiment of my invention, the numeral 1 designates a substantially circular casing, the same being open at its top. The casing is provided with a water inlet 2 at one side thereof and diametrically opposite said water inlet is the water outlet 3. The inlet and outlet respectively are externally threaded for connection with suitable water pipes (not shown) and in the manner well known in the art. Arranged within the casing 1 at the inlet and outlet thereof are the screens 4 and 5 respectively. An annular flange 6 is formed on the upper portion of the casing 1 and is provided with a series of spaced openings 7, the openings being threaded for the purposes of receiving the fastening bolts 8 which also extend through registering openings provided in the cover plate 9 for the open top of the casing. The bottom of the casing is provided with an eccentrically located bearing 10, the same being in vertical alignment with a bearing 11 formed in the under side of the cover plate 9. The purpose of these bearings will hereinafter be more fully described.

A rotor 12 of substantially crucifix design is adapted for rotation within the casing, the central portion of the rotor being formed with the top and bottom journals 13 and 14 respectively, the same being adapted to be disposed within the bearings 11 and 10 respectively whereby the rotor is eccentrically mounted within the casing.

Each of the arms 15 of the crucifix rotor 12 is provided with the longitudinally extending slot 16. A blade 17 formed preferably of rubber is adapted to be received in each of the slots provided in the several arms of the rotor and for normally projecting the outer edges of the blades outwardly so that the same are held in engagement with the inner wall of the circular casing, an expansible coil spring 18 is disposed in each slot, one end of the coil spring engaging the inner end of the slot, the opposite end of the coil spring being in engagement with the inner edge of the respective blade.

A balance plate 19 is disposed loosely over the upper journal 13 of the rotor 12, a helical coil spring 20 encircling the upper journal 13 and being disposed between the opposed faces of the cover plate 9 and the balance plate 19 respectively for normally holding the balance plate in engagement with the upper or top face of the rotor, the balance plate 19 is of approximately the same diameter as the inner diameter of the circular casing 1.

The balance plate 19 is prevented from rotating within the casing 1, through the medium of the cooperating key and slot designated generally by the numeral 26' and which is associated with the casing 1 and balance plate, respectively. However, the balance plate is free to move vertically in the casing on the upper journal 13. An opening 27 is provided in the balance plate and provides a water passage whereby a quantity of water which enters the casing through the inlet 2 will flow through the opening 27 into the space between the balance plate and the cover plate. The water in the aforementioned space will equalize the pressure and the coil spring 20 will force the balance plate downwardly into engagement with the upper face of the rotor, thus automatically taking up any wear which may occur as well as tending to steady the rotor.

A water register of any well known construction is designated generally by the numeral 21, the same being supported on the cover plate 9 in spaced relation thereto by the supporting means designated generally by the numeral 21. The operating shaft which actuates the registering or indicating mechanism associated with the register 21 is indicated at 23, the same extending downwardly through the support 22 and through the cover plate 9 at the point where the bearing 11 is provided. A stuffing box nut 24 is associated with the shaft or stem 23 in the manner as clearly illustrated in Figure 2. A key 25 is associated with the lower end of the shaft or stem 23 and is adapted to be received in a slot 26 provided therefor in the top of the journal 13 of the rotor 12 whereby the shaft or stem 23 will be operatively connected to the rotor.

It is obvious that when water enters the casing 1 through the inlet 2, the force of the water coming in contact with the radially disposed blades will cause the rotor to revolve within the casing and simultaneously actuate the shaft or stem associated with the train of gearing forming a part of the register 21, thus registering the amount of water which passes through the meter and out through the outlet 3. As the rotor revolves within the casing, the outer edges of the blades coming in contact with the inner wall of the casing will move inwardly within the respective slots provided therefor in the arms of the rotor, compressing the coil springs. The blades are further adapted to move radially as is obvious by the construction illustrated in Figure 1. There will be no possibility of any of the water escaping the outlet 3 during the rotation of the rotor.

The provision of a water meter of the above mentioned character, will enable the amount of water which is consumed to be accurately ascertained. The simplicity in which my device is constructed enables the several parts to be readily assembled or disassembled and furthermore the water meter embodying the present invention will at all times be positive and efficient in its operation.

The meter may also be used in connection with other fluids such as oil and the like, and I do not wish to limit myself to the particular fluid with which the meter is to be associated.

While I have shown the preferred embodiment of my invention, it is to be understood that various changes in the size, shape and arrangement of parts may be resorted to without departing from the spirit of the invention and the scope of the appended claim.

Having thus described the invention, what I claim is:—

In combination with a register having an operating stem, of a casing open at its top, said casing being provided with diametrically opposed inlet and outlet pipes, a cover plate for the open top of the casing, means for supporting the register on the cover plate, a rotor provided with radial slots arranged in the casing, journals at the top and bottom of the central portion of the rotor, the bottom of the casing and the aforementioned cover plate being provided with eccentrically arranged alining bearings for the respective journals, said operating stem extending downwardly through the cover plate and being operatively connected to the upper journal of the rotor, blades arranged for slidable movement in the slots of the rotor for engagement with the inner wall of the casing, a balance plate adapted for vertical slidable movement on the upper journal of the rotor, and a coil spring encircling the upper journal and disposed between the cover plate and the upper face of the balance plate for normally urging the latter downwardly into engagement with the upper face of the rotor.

In testimony whereof I affix my signature.

MATTHEW Y. FIELDHOUSE.